United States Patent
Owens et al.

(10) Patent No.: US 10,514,922 B1
(45) Date of Patent: Dec. 24, 2019

(54) TRANSFER TRIGGERED MICROCONTROLLER WITH ORTHOGONAL INSTRUCTION SET

(71) Applicant: Maxim Integrated Products, Inc., San Jose, CA (US)

(72) Inventors: Jeffrey D. Owens, Frisco, TX (US); Edward Tangkwai Ma, Plano, TX (US); Donald W. Loomis, Coppel, TX (US); Thomas Augustus Chenot, Parker, TX (US)

(73) Assignee: Maxim Integrated Products, Inc., San Jose, CA (US)

( * ) Notice: Subject to any disclaimer, the term of this patent is extended or adjusted under 35 U.S.C. 154(b) by 188 days.

(21) Appl. No.: 15/443,095

(22) Filed: Feb. 27, 2017

Related U.S. Application Data (60) Division of application No. 12/467,744, filed on May 18, 2009, now Pat. No. 9,582,283, which is a continuation of application No. 11/436,801, filed on May 18, 2006, now Pat. No. 8,521,989, which is a division of application No. 10/746,877, filed on Dec. 23, 2003, now abandoned.

(51) Int. Cl.
G06F 9/30 (2018.01)

(52) U.S. Cl.
CPC ........ *G06F 9/30141* (2013.01); *G06F 9/3001* (2013.01); *G06F 9/3016* (2013.01); *G06F 9/30032* (2013.01)

(58) Field of Classification Search
None
See application file for complete search history.

(56) References Cited

U.S. PATENT DOCUMENTS

| | | | | |
|---|---|---|---|---|
| 3,298,001 A | * | 1/1967 | Couleur | G06F 9/4812 710/5 |
| 3,440,611 A | * | 4/1969 | Falkoff | G06F 15/8007 708/520 |
| 5,684,435 A | * | 11/1997 | Bergen | G06F 7/4818 329/341 |
| 5,713,039 A | | 1/1998 | Tran | |
| 5,717,943 A | | 2/1998 | Barker et al. | |
| 5,768,574 A | | 6/1998 | Dutton et al. | |
| 5,812,867 A | | 9/1998 | Basset et al. | |
| 5,987,583 A | | 11/1999 | Triece et al. | |

(Continued)

OTHER PUBLICATIONS

McKinley, circa 2010, www.cs.utexas.edu (Year: 2010).*

(Continued)

*Primary Examiner* — Hyun Nam
(74) *Attorney, Agent, or Firm* — North Weber & Baugh LLP (57) ABSTRACT

A microcontroller includes a program memory, data memory, central processing unit, at least one register module, a memory management unit, and a transport network. Instructions are executed in one clock cycle via an instruction word. The instruction word indicates the source module from which data is to be retrieved and the destination module to which data is to be stored. The address/data capability of an instruction word may be extended via a prefix module. If an operation is performed on the data, the source module or the destination module may perform the operation during the same clock cycle in which the data is transferred.

7 Claims, 6 Drawing Sheets

(56) References Cited

U.S. PATENT DOCUMENTS

| | | |
|---|---|---|
| 6,877,084 B1 | 4/2005 | Christie |
| 2004/0037319 A1 | 2/2004 | Pandya |
| 2004/0039896 A1* | 2/2004 | Pechanek ............... G06F 9/325 |
| | | 712/205 |
| 2005/0091432 A1 | 4/2005 | Adams et al. |
| 2005/0108469 A1 | 5/2005 | Freeman et al. |
| 2005/0216638 A1 | 9/2005 | Smith et al. |
| 2007/0011440 A1* | 1/2007 | Niitsuma ............... G06F 9/384 |
| | | 712/217 |

OTHER PUBLICATIONS

Wikipedia, "Accumulator," Dec. 17, 2002 (1pg).
Hyde, Randall, "The Art of Assembly Language Programming," Sep. 30, 1996 (58pgs).
Ross, Kevin, "The PIC Chip Uncovered," May 1997 (8pgs).
Patternson and Hennessy, "Computer Organization and Design: The Hardware/Software Interface," Morgan Haufmann Publishers, Inc., San Francisco, CA 1998, pp. 343-542 (24pgs).
Office Action dated Jul. 25, 2006, in U.S. Appl. No. 10/746,877 (11pgs).
Office Action dated Mar. 7, 2007, in U.S. Appl. No. 10/746,877 (13pgs).
OSdata.com, "Assembly Language," printed Aug. 12, 2015 (6pgs).

* cited by examiner

TRANSFER TRIGGERED MICROCONTROLLER WITH ORTHOGONAL INSTRUCTION SET

CROSS REFERENCE TO RELATED PATENT APPLICATIONS

This application is a divisional of previously filed U.S. patent application Ser. No. 12/467,744, entitled "TRANSFER TRIGGERED MICROCONTROLLER WITH ORTHOGONAL INSTRUCTION SET," naming as inventors, Jeffrey D. Owens, Edward Tang K. Ma, Donald W. Loomis and Thomas Augustus Chenot, and filed May 18, 2009, now U.S. Pat. No. 9,582,283, issued Feb. 28, 2017, which application is a continuation of U.S. patent application Ser. No. 11/436,801, entitled "A PROGRAMMABLE AND SCALABLE MICROCONTROLLER ARCHITECTURE," naming as inventors, Jeffrey D. Owens, Edward Tang K. Ma, Don Loomis and Tom Chenot, and filed May 18, 2006, now U.S. Pat. No. 8,521,989, issued Aug. 27, 2013, which is a divisional of U.S. patent application Ser. No. 10/746,877, entitled "MAXQ MICROCONTROLLER," naming as inventors, Jeffrey D. Owens, Edward Tang K. Ma, Don Loomis and Tom Chenot, and filed Dec. 23, 2003, now abandoned.

BACKGROUND

A. Technical Field

The present invention is generally related to integrated circuit devices, and more specifically, but not by way of limitation, to microcontrollers and microcontroller data transports.

B. Background of the Invention

Microcontroller system designers today have a myriad of choices when it comes to selecting a microcontroller for a project, i.e., 8-bit, 16-bit, RISC, CISC, or something in between. In most cases, many criteria are considered during the selection process. For example, most designers take into consideration the price, performance, power, code density, development time, functional features, and even further migration path alternatives when choosing the proper microcontroller. To complicate the selection process, demands related to one criterion generally influence the options in the other areas. Factors that are critical in one application may have little or no importance in another. Consequently, there is no one microcontroller that is perfect for all projects. However, a modern microcontroller should be flexible or adapt to fit a variety of design constraints.

When integrating complex analog circuitry with high-performance digital blocks, the operating environment should be kept as quiet and noise-free as possible. However, the clocking and switching that occur in the digital circuits of a microcontroller core inject noise into the sensitive analog section. One of the more complex issues surrounding microcontrollers is the ability to achieve high microcontroller performance while minimizing clock noise that may adversely affect sensitive analog circuits.

For most existing microprocessors, an instruction requires several clock cycles to execute, thereby increasing the noise transmitted to the surrounding environment. For example, RISC microcontrollers execute simple instructions at high clock frequencies and utilize execution pipeline(s) to improve system throughput. However, pipelines could cause pipeline hazards, because the pipeline approach requires either a complier to anticipate potential resource conflicts or built-in hardware to detect and handle pipeline problems. When a program branch occurs, the RISC CPU utilizes one or more clock cycles (depending on the depth of the pipeline) to divert program fetching to the target branch address and discard the instruction(s) already fetched. As such, at least one additional clock cycle is required to discard instructions, thereby decreasing performance and increasing power consumption. In addition, performance of most traditional RISC microcontrollers is limited by the number of registers available for user applications.

Therefore, there is a need for a microcontroller with increased efficiency that minimizes adverse effects to surrounding components.

SUMMARY OF THE INVENTION

The present invention provides a microcontroller and related system. More particularly, one embodiment of the present invention relates to a microcontroller. The microcontroller includes at least one register module for performing instructions or storing data, a program memory for providing read-only memory, and a data memory for providing read and write memory. The data memory is separate from the program memory. The microcontroller also includes a memory management unit for supporting the program memory and the data memory, at least one module for providing a specific functionality to the microcontroller, a central processing unit for controlling operations of the microcontroller, and a point-to-point transport network for providing a data path between the microcontroller, the at least one register module, the program memory, and the data memory. An instruction word causes an instruction to be executed in a single clock cycle.

In another embodiment, the present invention relates to an instruction for causing execution of a command. The instruction includes a source operand for indicating a source module from which data is retrieved, a destination operand for indicating a destination module to which data is transmitted, and a format bit for indicating whether the instruction is an immediate source instruction or a register source instruction.

In another embodiment, the present invention relates to a method for executing an instruction for a microcontroller. The method includes the steps of fetching data from a source module, performing an operation on the fetched data, and storing the data at a destination module. The steps of fetching, performing, and storing are executed in one clock cycle.

BRIEF DESCRIPTION OF THE DRAWINGS

A more complete understanding of principles of the present invention may be obtained by reference to the following Detailed Description when taken in conjunction with the accompanying Drawings wherein.

DETAILED DESCRIPTION OF THE PREFERRED EMBODIMENTS

In accordance with an embodiment of the present invention, a microcontroller utilizes single cycle instruction execution. Single cycle instruction execution permits higher performance, and/or reduced power consumption. Although the microcontroller in this embodiment is illustrated as performing most operations in a single clock cycle, it will be understood by those skilled in the art that some instructions, such as long jump/long call, and/or various extended register accesses may be executed in more than one clock cycle.

Figure 1:
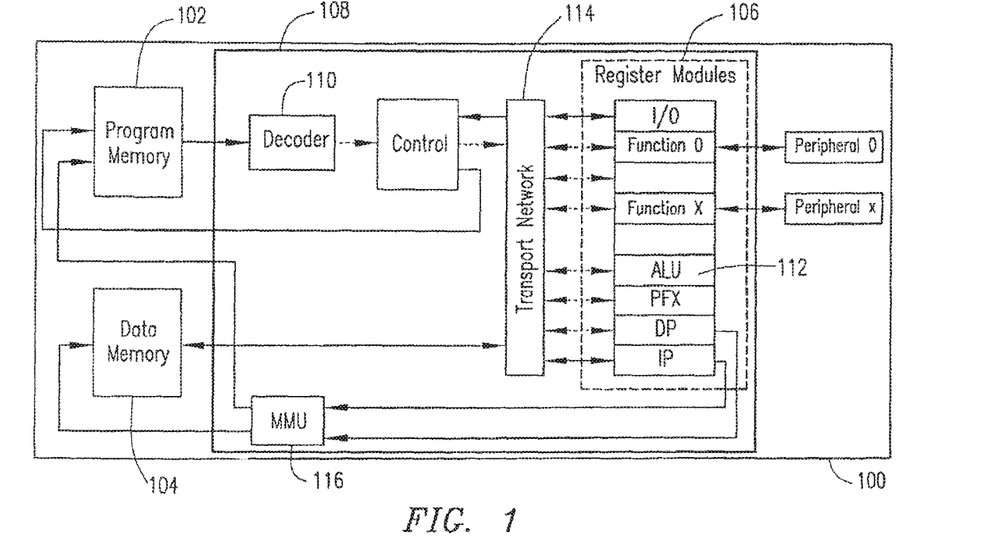
FIG. 1 is a block diagram illustrating a microcontroller in accordance with an embodiment of the present invention.

Referring now to FIG. 1, a microcontroller 100 in accordance with one of the preferred embodiments of the present invention is illustrated. The microcontroller 100 may be implemented as a non-pipelined processor that allows the microcontroller 100 to fetch, decode, and execute an instruction in the same clock cycle. The microcontroller 100 utilizes a Harvard architecture that employs a program memory 102 that is separate from a data memory 104. Separate program and data memories 102, 104 permit simultaneous access to both memories 102, 104 and can allow for the utilization of different word lengths for each memory 102, 104. Access to either the program memory 102 or the data memory 104 may be programmable in byte or word boundary on-the-fly, dependent on the application. The program memory 102 may be implemented with nonvolatile read only memory or any other memory scheme with similar characteristics. The data memory 104 may be realized by an SRAM memory which allows both read and write operations, however, other memory schemes may be utilized that allow read and write operations. In addition, to provide support for application programming, data memory space may be mapped into a pre-defined program memory segment, allowing direct program execution on data memory 104. In contrast, program memory space may be made accessible from the data memory space to provide transparent access of constant data stored in the program memory 102.

The size of the on-chip data memory 104 available for the user application is dependent on the actual chip implementation. The data memory 104 may be accessed via indirect register addressing through a Data Pointer (@DP) or Frame Pointer (@BP[Offs]). The Data Pointer is used as one of the operands in a "move" instruction. If the Data Pointer is used as a source, the microcontroller 100 performs a Load operation which reads data from the data memory location addressed by the Data Pointer. If the Data Pointer is used as a destination, the microcontroller 100 executes a Store operation that writes data to the data memory location addressed by the Data Pointer. If two data pointers are used, one as a source and another as the destination, a direct memory-to-memory transfer occurs. In addition, the Data Pointer may be used as a pre-increment/decrement pointer by a "move" instruction for a memory write or post-increment/decrement pointers by a "move" instruction for a memory read.

Also located within the microcontroller 100 is ideally at least one register module 106. The use of register modules 106 lends reconfigurability to the microcontroller 100. The register modules 106 (i.e., serial ports, A/D converters, or any I/O or processing device) may be plugged or unplugged from the microcontroller 100 as a user deems desirable. By permitting reconfigurability of the register modules 106 within the microcontroller 100, the microcontroller 100 is flexible and may be tailored to fit a number of different applications. The register modules 106 also enable register-to-register communication/data transfer, allowing an instruction to perform meaningful work directly. The register modules 106 may be accessible by the user program and therefore registers may not be "wasted" and intermediate transactions may not be necessary.

A register module 106 may be identified by a 4-bit specifier (shown in FIG. 4) and the register module 106 includes a bank of registers that may be addressed by a 5-bit sub-decode. The 5-bit sub-decode may be used as an index for register identification to address one of the internal registers in the register module 106. Alternatively, the 5-bit sub-decode may be used as an operational code in a functional module to specify a specific Central Processing Unit (CPU) 108 operation. The internal registers may be accessed via direct or indirect addressing and may be grouped into two categories, special purpose registers (SPR) and special function registers (SFR). SPRs may be Accumulators, an Instruction Pointer, a Stack Pointer, a Data Pointer, a Loop Counter, a Status Register, etc. SPRs support essential CPU 108 functions and system control functions, whereas SFRs may support any peripherals or user functions that are not part of the CPU 108 and system control functions. The SFRs allow communication and data exchange between the CPU 108 and the peripherals.

The CPU 108 controls the operation of the microcontroller 100 through the execution of user code stored in the program memory 102. The CPU 108 controls the program memory address and data buses, the data memory address and data buses, and stack operation. An instruction is fetched from the program memory 102 and sent to the instruction register of a decoder 110. The CPU 108 decodes, via the decoder 110, the instruction and performs necessary operations as defined by the instruction. The decoder 110 determines the destination and source for an instruction. Detailed operational decoding is closely associated with destination and source modules. This approach limits switching activities to the necessary data path and minimizes on-chip power dissipation.

Many of the instructions require operations to be performed on data. The main execution unit for the CPU 108 is the Arithmetic Logic Unit (ALU) 112. The ALU 112, for example, performs addition, subtraction, comparison, shift and logical operations. Instruction decoding prepares the ALU 112 and provides the appropriate data. The ALU 112 primarily uses an accumulator module and any of the on-chip registers/memory or an immediate value embedded in the instruction as the source for operations. The accumulator module is ideally incorporated in a modulo fashion with specific hardware support. Each of the registers in the accumulator module may be accessed explicitly by an instruction. Instructions related to arithmetic and logical operations are associated with the active accumulator (acc). The active accumulator may be activated by the user program via an accumulator point (AP) register. The AP register is used to select one of the available registers in the module as the active accumulator. The AP register may be programmed to automatically increment or decrement the selection of the active accumulator in a module fashion after an execution of an ALU 112 operation through an Accumulator Point Control (APC) register. The APC register provides a user option to enable the AP's post increment/decrement function and the modules selection for modulo operation.

The data path of the microcontroller 100 is ideally implemented as a point-to-point transport network 114. By utilizing a transport network 114, there is no internal system bus. The transport network 114 allows a fast, point-to-point interconnection between the microcontroller 100, register modules 106, and memories 102, 104. The transport network 114 also allows power dissipation to be localized in only the active functional units and switching activity may be limited to only those circuitries. By reducing switching activity, noise may be reduced and efficiency may be increased. The transport network 114 may be implemented as multiplexers, switches, routers, etc. depending on the required system throughput.

The microcontroller 100 may also include a memory management unit (MMU) 116. The MMU 116 may be capable of supporting two of the memory architectures for microprocessors in one design. The microcontroller 100 provides a programmable method to merge different physical memories in different memory spaces (program and data) into one linear memory space on-demand and on-the-fly. With the MMU 116, the microcontroller 100 is capable of supporting in-application programming and in-system programming directly. A memory can be used as program memory, a data memory, or both data and program memories. The MMU 116 creates a large virtual memory map for both program and data space. In addition, data transfers between different physical memories may be handled by a simple MOVE instruction.

Figure 2:
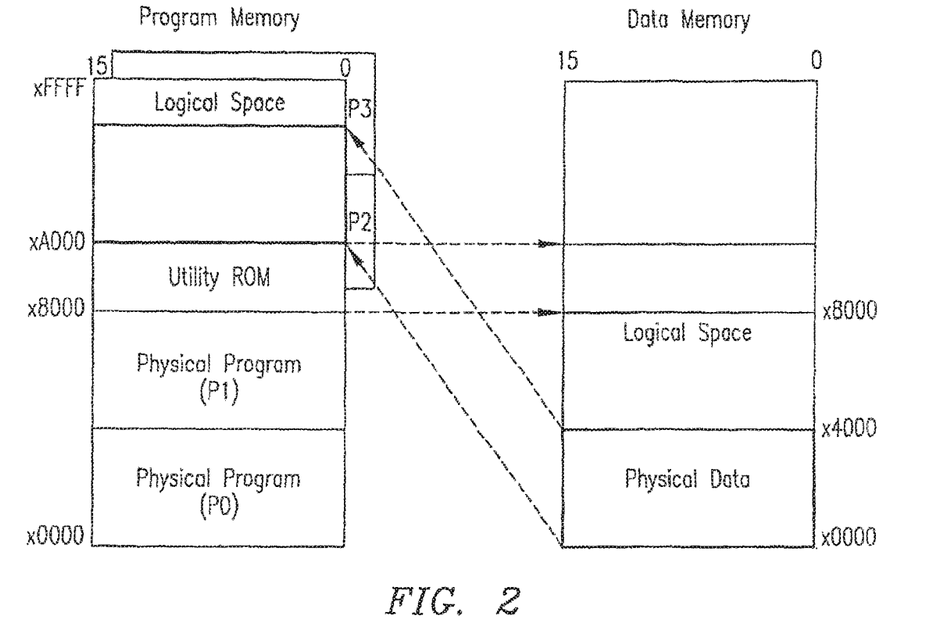
FIG. 2 is a block diagram illustrating the memory mapping capabilities of a memory management unit in accordance with an embodiment of the present invention.

As shown in FIG. 2, a block diagram illustrating memory mapping capabilities of the MMU is shown. The program space may be divided into four equal segments (P3:P0). By default the upper two segments (P3:P2) may not be accessible for program execution until they are implicitly activated by the user software via a register bit. A small utility ROM may be assigned to the upper half of the program space with the remaining program space reserved as the logic space for the physical data memory. Once the upper program access bit is set, P3:P2 occupies the upper half of the program space and the utility ROM and the physical data memory may be accessed as data only. When the physical data memory functions as program memory, the lower half of the data space is the logical space for the physical program memory, and the upper half of the data space is the logical space for the physical utility ROM. The mapping of the data space is limited by the byte mode addressing range when switching between word to byte mode. Two register bits may be used to selectively assign one or two program segments to the data space when necessary.

Another register module 106 of the microcontroller 100 of FIG. 1 may be a prefix module. The prefix module allows the extension of addressing capability of the microcontroller 100 over the length of an instruction word, such as branch to long range, addressing registers in a large register map otherwise not made visible to the user. The prefix module provides data exchange between modules with mismatched bit length, such as byte to word data transfer. The prefix module may provide protection for register functions that may be guarded against unintentional accessing. The prefix module may be activated in a predetermined timing window (e.g., one cycle), so the accessibility of a register module 106 that requires prefix addressing is time and instruction dependent. Therefore, it becomes difficult to unintentionally access and alter the contents of these register modules 106.

Figure 3:
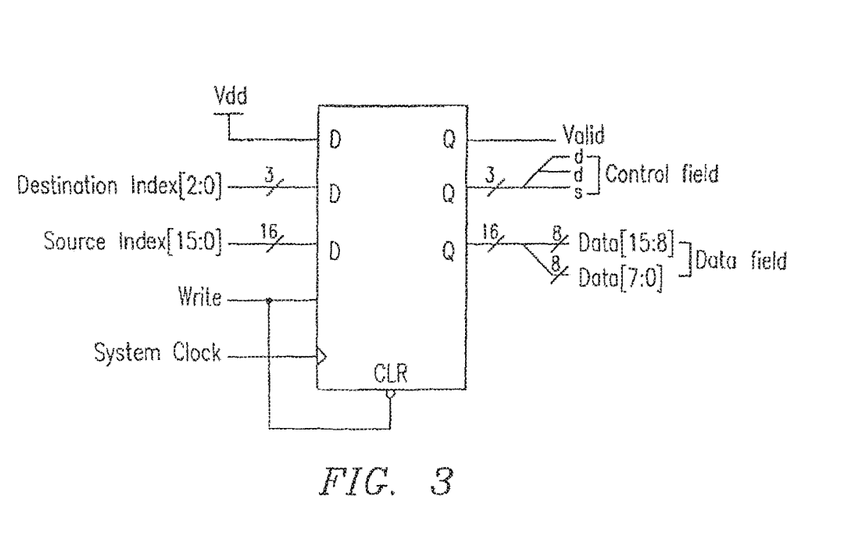
FIG. 3 is a block diagram of a prefix module in accordance with an embodiment of the present invention.

A prefix function is activated by a move instruction that specifies the prefix module as its destination register. The prefix module may be realized by a 20-bit register with synchronous clear as illustrated by FIG. 3. To supply the higher order bits to the destination of an instruction that requires a bit length longer than its operand can offer, the prefix module holds its data content (Source Data[15:0]) for one clock cycle before clearing all data bits to zero. When the prefix is active, its lower 8-bit data content (Data[7:0]), may be used as the eight most significant bits and concatenated with the source operand of the successive instruction to form a 16-bit instruction. In this case, if the instruction is a branch instruction, the resulting address is extended to the full addressing range.

To access multi-cycle registers, the prefix register is used to activate the targeted index bits of the source and/or destination of the next instruction for one cycle by supplying the prefix index N (Destination Index [2:0]) in the form of "dds", where "s" is the extended index bit 4 for source of the succeeding instruction and "dd" is the extended index bits 4 and 3 for the destination of the succeeding instruction. These bits together for a control prefix field which is separated from its 16 bit data field.

To implement single clock cycle execution, the instruction set designates a source register module and a destination register module without specifying an operation. Access to register modules may be explicit or implicit as part of the execution of an instruction. Some register modules may be accessed implicitly or explicitly. In accordance with an embodiment of the present invention, a source module may execute the requested operation as the data is leaving the source module, or the destination module may execute the requested operation as the data is received. In this manner, a single clock cycle is utilized to move the data and perform the requested operation.

Figure 4:
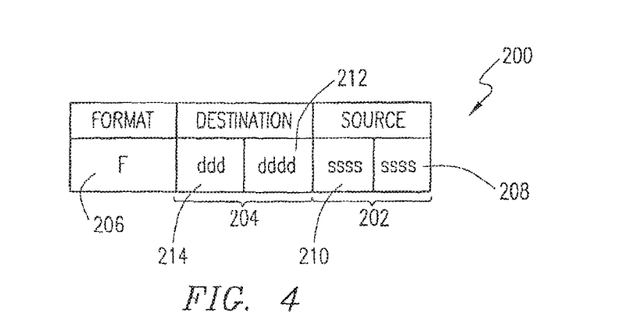
FIG. 4 is a block diagram illustrating an instruction word in accordance with an embodiment of the present invention.

In one aspect of the present invention, as illustrated in FIG. 4, a 16-bit word instruction 200 is utilized. Although the preferred embodiment implements a 16-bit instruction word, various other lengths of instruction words may be utilized in accordance with the present invention. The format of the instruction word 200 is based on a format bit 206, a source operand 202, and a destination operand 204, and therefore allows utilization of high level programming language support for application code generation and optimization. The instruction word 200 causes execution of a "move" command by specifying a source and destination. Source and destination operands 202, 204 are the basis for creating instructions, memory accesses, and triggering hardware operations. The source operand 202 includes 8-bits, although other lengths are possible, and designates the source of the data that is to be moved by the instruction. The destination operand 204 includes 7-bits, although other lengths are possible, and designates the destination of the data moved by the instruction. The source format bit 206 indicates whether the instruction is an immediate source instruction or a register source instruction. For example, when coded as a '0', the source format bit 206 allows any immediate or literal byte value to be supplied as a source operand 202. Unrestricted support for any immediate byte source within a single instruction word may be valuable during register initialization routines and when performing ALU operations. When the source format bit 206 is coded as a '1', the instruction is a register source instruction and the source operand 202 represents a register source specifier.

The source operand 202 may be divided into two portions. In this case, the latter four bits 208 may designate a specific source module from which data is to be retrieved. The first four bits 210 may indicate either an index of the source module or an operation to be performed on the data. The destination operand 204 may be divided into two portions similar to that of the source operand 202. The latter four bits 212 of the destination operand 204 refer to the specific destination module to which data is to be transferred. The first three bits 214 refer to either an index of the destination module or an operation to be performed on the data.

To further expand the functionality and addressing capability of a selected instruction word length, the instruction bus may be implemented as an 18-bit bus with three additional bits supplied from the "dds" control field of the prefix module as previously described.

As illustrated above, the source and destination operands 202, 204 may be utilized to select physical device registers. However, the source and destination operands 202, 204 are not rigidly associated with physical registers and may instead designate specific operations to be performed on a particular piece of data. For example, the source and destination operands 202, 204 may be utilized to perform an indirect memory access. Specific source and/or destination operands 202, 204 may be identified as indirect access portals to physical memories such as a stack, accumulator array, or the data memory. The indirect memory access portals utilize physical pointer registers to define the respective memory address locations for access. For example, one way that the data memory can be accessed indirectly is using a '@DP[0]' operand. This operand, when used as a source or destination, triggers an indirect read or write access to the data memory location addressed by the Data Pointer 0 (DP[0]) register.

In addition, specific source and/or destination operands 202, 204 may be utilized to trigger underlying hardware operations. The trigger mechanism serves as the basis for creating instructions that are implicitly linked to specific resources. For example, math operations (i.e., ADD, SUB, ADDC, and SUBB) are implemented as special destination encodings that implicitly target one of the working accumulators, with only the source operand supplied by the user. Conditional jumps implicitly target an instruction pointer (IP) for modification and are implemented as separate destination encodings for each status condition that can be evaluated. The indirect memory access and underlying hardware operation triggers are combined whenever possible to create new source/destination operands 202, 204 which give dual benefits to the user. For instance, when reading from the data memory 104 with, e.g., Data Pointer 0, the user may optionally increment or decrement the pointer following the read operation using a '@DP[0]++' or '@DP[0]--' source operand respectively.

As shown below in Table 1, an exemplary instruction set utilizing the above described structure is listed. The instruction words may explicitly list an entire instruction word, including the source format bit, or portions of the instruction word, such as the destination operand, may be explicitly listed. Although Table 1 illustrates specific functions as being performed by specific instruction words, it will be understood by one skilled in the art that various instruction words may be utilized to perform a specific function. 1TABLE 1 Instruction Code Description Flags f001 1010 ssss ssss (Acc)=(Acc) AND src; S, Z f=0: src=#literal, f=1: src=(register) f010 1010 ssss ssss (Acc)=(Acc) OR src; S, Z f=0: src=#literal, f=1: src=(register) f011 1010 ssss ssss (Acc)=(Acc) XOR src; S, Z f=0: src=#literal, f=1: src=(register) f100 1010 ssss ssss (Acc)=(Acc)+src; C, S, Z, f=0: src=#literal, f=1: src=(register) OV f101 1010 ssss ssss (Acc)=(Acc)−src; C, S, Z, f=0: src=#literal, f=1: src=(register) OV f110 1010 ssss ssss (Acc)=(Acc)+src+(C); C, S, Z, f=0: src=#literal, f=1: src=(register) OV f111 1010 ssss ssss (Acc)=(Acc)−src−(C); C, S, Z, f=0: src=#literal, f=1: src=(register) OV 1000 1010 0001 1010 (A)=(A) S, Z 1000 1010 0010 1010 (A15-0)=(A14-0),0 and (C)=(A15) C, S, Z 1000 1010 0011 1010 (A15-0)=(A13-0),0,0 and (C)=(A14) C, S, Z 1000 1010 0110 1010 (A15-0)=(A11-0),0,0,0,0 and (C)=(A12) C, S, Z 1000 1010 0100 1010 (A7-0)=(A6-0,7) S (A15-0)=(A14-0,15) 1000 1010 0101 1010 (A15-0)=(A14-0),(C) and (C)=(A15) C, S, Z 1000 1010 1001 1010 (A)=(A)+1 S, Z 1000 1010 1010 1010 (A15-0)=0,(A15-1) and (C)=(A0) C, S, Z 1000 1010 1100 1010 (A15-0)=(A0,15-1) S 1000 1010 1101 1010 (A15-0)=(C),(A15-1) and (C)=(A0) C, S, Z 1000 1010 1111 1010 (A15-0)=(A15),(A15-1) and (C)=(A0) C, Z 1000 1010 1110 1010 (A15-0)=(A15),(A15),(A15-2) and (C)=(A1) C, Z 1000 1010 1011 1010 (A15-0)=(A15),(A15),(A15),(A15),(A15-4) and (C)=(A3) C, Z f111 1000 ssss ssss If (Acc)=src, then (E)=1; E else, (E)=0 fddd dddd ssss ssss (dst)=src; S, Z f=0: src=#literal, f=1: src=(register) C, E 1000 1010 0111 1010 (A15-0)=(A11-8,15-12,3-0,7--4) S 1000 1010 1000 1010 (A15-0)=(A7-0,15-8) S f000 1101 ssss ssss (SP)=(SP)+1, ((SP))=src; f=0: src=#literal, f=1: src=(source specifier). This is equivalent to MOVE @SP, src. 1ddd dddd 0000 1101 (dst)=((SP)), S, Z (SP)=(SP)−1, C, E This is equivalent to MOVE dst, @SP 1ddd dddd 1000 1101 (dst)=((SP)), S, Z (SP)=(SP)-1, C, E This is equivalent to MOVE dst, @SPI. 1001 1010 bbbb 1010 (C)=(C) AND (Acc.b) C For a selected bit in the Active Accumulator where b=0:15 as selected by the source index "bbbb". 1010 1010 bbbb 1010 (C)=(C) OR (Acc.b) C For a selected bit in the Active Accumulator where b=0:15 as selected by the source index "bbbb". 1011 1010 bbbb 1010 (C)=(C) XOR (Acc.b) C For a selected bit in the Active Accumulator where b=0:15 as selected by the source index "bbbb". 1101 1010 0000 1010 (C)=0 C 1101 1010 0001 1010 (C)=1 C 1101 1010 0010 1010 (C)=(C) C 1110 1010 bbbb 1010 (C)=(Acc.b) C For a selected bit in the Active Accumulator where b=0:15 as selected by the source index "bbbb". 1111 1010 bbbb 1010 (Acc.b)=(C) S, Z For a selected bit in the Active Accumulator where b=0:15 as selected by the source index "bbbb". 1ddd dddd 0bbb 0111 (dst.b)=0 S, Z For a selected bit in the destination register where b=0:7 as C, E selected by the source index "bbb". 1ddd dddd 1bbb 0111 (dst.b)=1 S, Z For a selected bit in the destination register where b=0:7 as C, E selected by the source index "bbb". fbbb 0111 ssss ssss (C)=src.b C For a selected bit in the source where b=0:7 as selected by the destination index "bbb". For f=0: src=#literal, f=1: src=(register). f000 1100 ssss ssss If f=1, then—for 16-bit register operand (IP)=(src)—for 8-bit register operand (IP)=(PFX);(src) If f=0, then—if PFX is not activated (IP)=(IP)+1+Immediate data—Immediate data is 2's complement with sign extended—if PFX is activated (IP)=(PFX);Immediate data. f001 1100 ssss ssss If Z=1, then If f=1, then—for 16-bit register operand (IP)=(src)—for 8-bit register operand (IP)=(PFX);(src) If f=0, then—if PFX is not activated (IP)=(IP)+1+Immediate data—Immediate data is 2's complement with sign extended —if PFX is activated (IP)=(PFX);Immediate data. else, (IP)=(IP)+1. f010 1100 ssss ssss If C=1, then If f=1, then—for 16-bit register operand (IP)=(src)—for 8-bit register operand (IP)=(PFX);(src) If f=0, then—if PFX is not activated (IP)=(IP)+1+Immediate data—Immediate data is 2's complement with sign extended—if PFX is activated (IP)=(PFX);Immediate data. else, (IP)=(IP)+1. 0011 1100 ssss ssss If E=1, then If PFX is not activated, then (IP)=(IP)+1+Immediate data—Immediate data is 2's complement with sign extended If PFX is activated, then (IP)=(PFX); Immediate data else, (IP)=(IP)+1. f100 1100 ssss ssss If S=1, then If f=1, then—for 16-bit register operand (IP)=(src)—for 8-bit register operand (IP)=(PFX);(src) If f=0, then—if PFX is not activated (IP)=(IP)+1+Immediate data—Immediate data is 2's complement with sign extended—if PFX is activated (IP)=(PFX);Immediate data. else, (IP)=(IP)+1. f101 1100 ssss ssss If Z=0, then If f=1, then—for 16-bit register operand (IP)=(src)—for 8-bit register operand (IP)=(PFX);(src) If f=0, then—if PFX is not activated (IP)=(IP)+1+Immediate data—Immediate data is 2's complement with sign extended—if PFX is activated (IP)=(PFX);Immediate data. else, (IP)=(IP)+1. f110 1100 ssss ssss If C=0, then If f=1, then—for 16-bit register operand (IP)=(src)—for 8-bit register operand (IP)=(PFX);(src) If f=0, then—if PFX is not activated (IP)=(IP)+1+Immediate data—Immediate data is 2's complement with sign extended—if PFX is activated (IP)=(PFX);Immediate data. else, (IP)=(IP)+1. 0111 1100 ssss ssss If E=0, then If PFX is not activated, then (IP)=(IP)+1+Immediate data—Immediate data is 2's complement with sign extended If PFX is activated, then (IP)=(PFX); Immediate data else (IP)=(IP)+1. f10n 1101 ssss ssss (LC[n])=(LC[n])−1, If LC[n]<>0, then If f=1, then—for 16-bit register operand (IP)=(src)—for 8-bit register operand (IP)=(PFX);(src) If f=0, then—if PFX is not activated (IP)=(IP)+1+Immediate data—Immediate data is 2's complement with sign extended in the range of +127 to −128 in decimal.—if PFX is activated (IP)=(PFX);Immediate data else (IP)=(IP)+1. for n=0:1 as selected by the destination index "n". f011 1101 ssss ssss (IP)=(IP)+1, (SP)=(SP)+1, ((SP))=(IP), If f=1, then—for 16-bit register operand (IP)=(src)—for 8-bit register operand (IP)=(PFX);(src) If f=0, then—if PFX is not activated (IP)=(IP)+1+Immediate data—Immediate data is 2's complement with sign extended—if PFX is activated (IP)=(PFX);Immediate data. 1000 1100 0000 1101 (IP)=((SP)), (SP)=(SP)-1. 1000 1100 1000 1101 (IP)=((SP)), (SP)=(SP)-1. 1001 1100 0000 1101 if Z=1, then (IP)=((SP)), (SP)=(SP)-1; else, (IP)=(IP)+1. 1001 1100 1000 1101 If Z=1, then (IP)=((SP)), (SP)=(SP)-1; else, (IP)=(IP)+1. Note: This instruction also clears INS bit if return is taken. 1010 1100 0000 1101 If C=1, then (IP)=((SP)), (SP)=(SP)-1; else, (IP)=(IP)+1. 1010 1100 1000 1101 If C=1, then (IP)=((SP)), (SP)=(SP)-1; else, (IP)=(IP)+1. Note: This instruction also clears INS bit if return is taken. 1100 1100 0000 1101 If S=1, then (IP)=((SP)), (SP)=(SP)-1; else, (IP)=(IP)+1. 1100 1100 1000 1101 If S=1, then (IP)=((SP)), (SP)=(SP)-1; else, (IP)=(IP)+1. Note: This instruction also clears INS bit if return is taken. 1101 1100 0000 1101 If Z=0, then (IP)=((SP)), (SP)=(SP)-1; else, (IP)=(IP)+1. 1101 1100 1000 1101 If Z=0, then (IP)=((SP)), (SP)=(SP)-1; else, (IP)=(IP)+1. Note: This instruction also clears INS bit if return is taken. 1110 1100 0000 1101 If C=0, then (IP)=((SP)), (SP)=(SP)-1; else, (IP)=(IP)+1. 1110 1100 1000 1101 If C=0, then (IP)=((SP)), (SP)=(SP)-1; else, (IP)=(IP)+1. Note: This instruction also clears INS bit if return is taken. 1101 1010 0011 1010 (IP)=(IP)+1.

Figure 5:
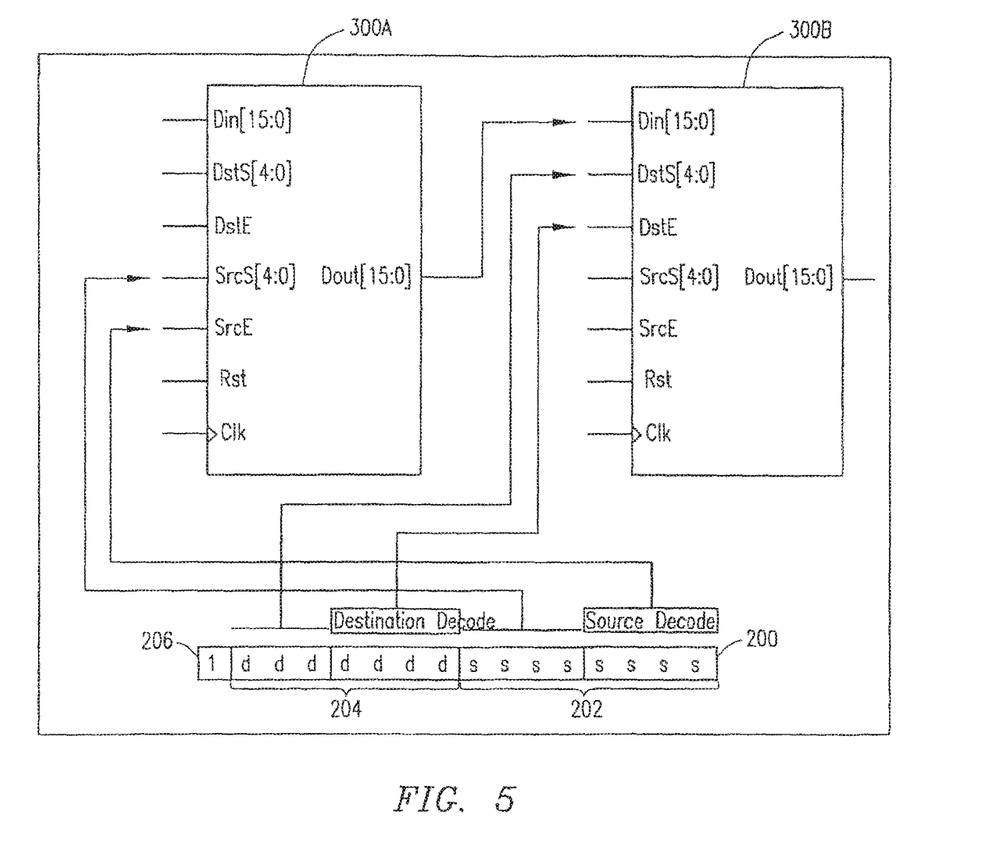
FIG. 5 is a block diagram illustrating data transfer between to modules.

Referring now to FIG. 5, an exemplary instruction word and data transfer between modules 300 is illustrated. A module 300 may include a number inputs and outputs, and although the preferred embodiment implements a specific arrangement, various other implementations may be utilized to suit specific applications. Each module 300 ideally includes a "Data in" port Din[15:0] which represents the basic data bus for data transfer, a "Data out" port Dout[15:0] which represents the basic data bus for data transfer, a "Destination Sub-decode" port DstS[4:0] which receives either operational codes for modular operation, or indexes for registers in the module 300, and a "Destination Enable" port DstE which is asserted for the selected destination module. The DstE port receives a signal from the decoder 108 to enable the destination module 300B. The modules 300 also include a "Source Sub-decode" port SrcS[4:0] which receives either operational codes for modular operation, or indexes for registers in the module and a "Source Enable" port SrctE which is asserted for the selected source module. The SrctE port receives a signal from the decoder 108 to enable the source module 300A. In this exemplary illustration, the instruction 200 causes a source module 300A designated by the latter four bits 208 of the source operand 202, to perform, for example, an operation designated by the first four bits 210 of the source operand 202. The operation is performed and the data is transferred from the source module 300A to the destination module 300B via the Dout port of the source module 300A and the Din port of the destination module 300B. The destination module 300B specified by the latter four bits 212 of the destination operand 204 stores the data in the index indicated by the former three bits 214 of the destination operand 204. It will be understood by one skilled in the art that the other high order "sub-decode", either SrcS[4:0] or DstS[4:0] may be from the prefix module.

Figure 6:
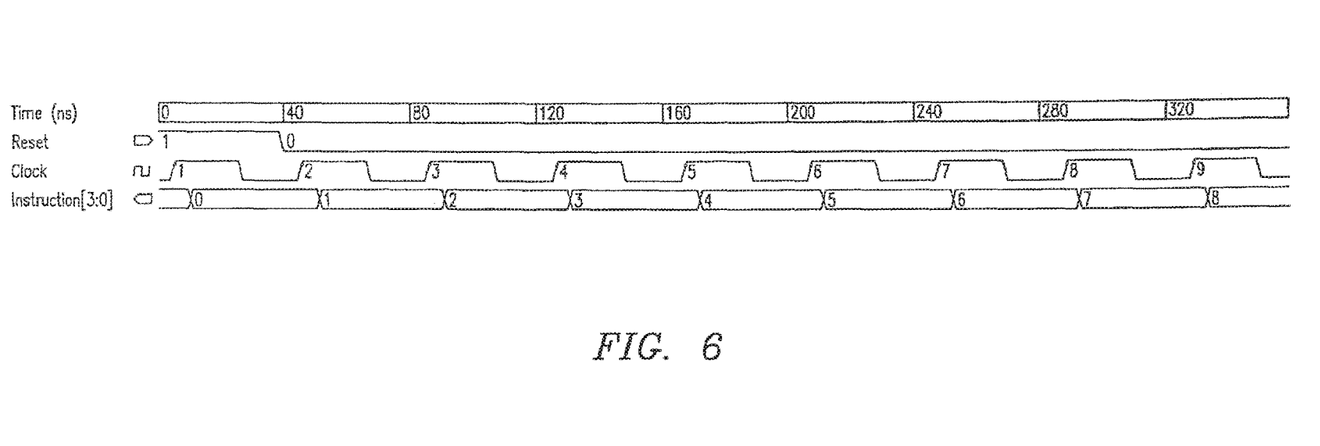
FIG. 6 is a clock cycle diagram illustrating the timing of operations and instructions in a microcontroller in accordance with an embodiment of the present invention.

Referring now to FIG. 6, a timing diagram illustrating the single clock cycle execution utilized by the present invention is shown. As shown, an instruction (i.e., instructions 0-7) is executed on each rising edge of the clock cycle. In accordance with an alternate embodiment of the invention, each instruction may be executed on each falling edge of the clock cycle. Each clock cycle executes an instruction and therefore, no waste clock cycles are needed to discard previous instructions. In yet another embodiment, the clock cycle may be irregular. To implement the irregular clock cycle, the smallest pulse-width should be visible to the slowest flip-flop in the system and the instantaneous active-edge-frequency should be at or below the maximum processor operating frequency. Regardless of whether the clock cycle is uniform or irregular, an instruction is executed at each rising edge or falling edge of the clock cycle.

Figure 7:
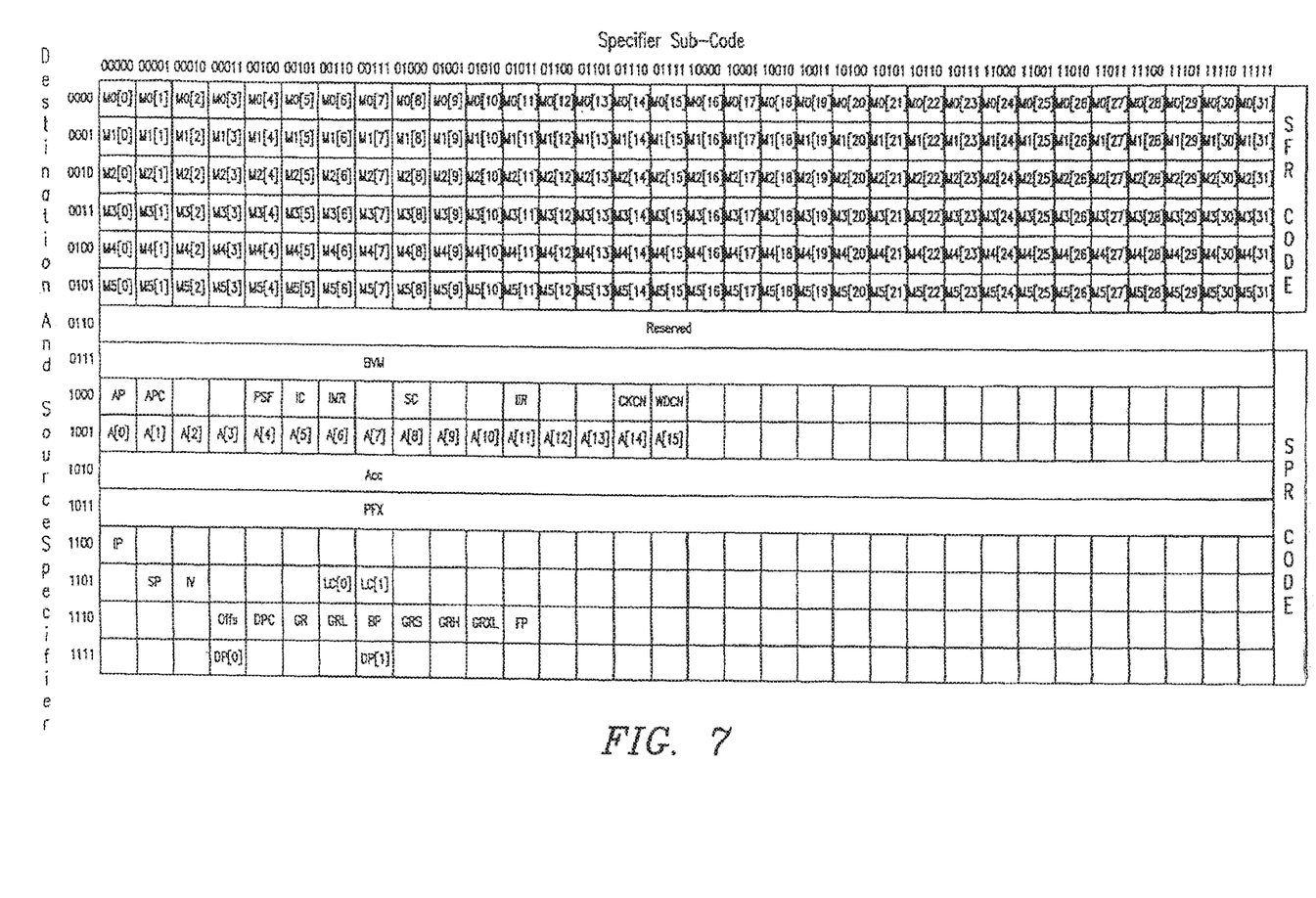
FIG. 7 is a register map for the register modules of a microcontroller as shown in FIG. 1.

Referring now to FIG. 7, a register map of the registers that may be available in user mode operation of the microcontroller 100. Except for the M6, BVM, Acc, and PFX modules, open locations in the Special Purpose Register (SPR) space may be utilized for hardware functional use or reserved for future expansion. Special Function Register (SFR) space may be used to support other system or peripheral functions and the register assignment may be chip dependent. As previously mentioned, the prefix module extends the addressing capabilities of the microcontroller 100, allowing accessing to registers in a large register map.

Figure 8:
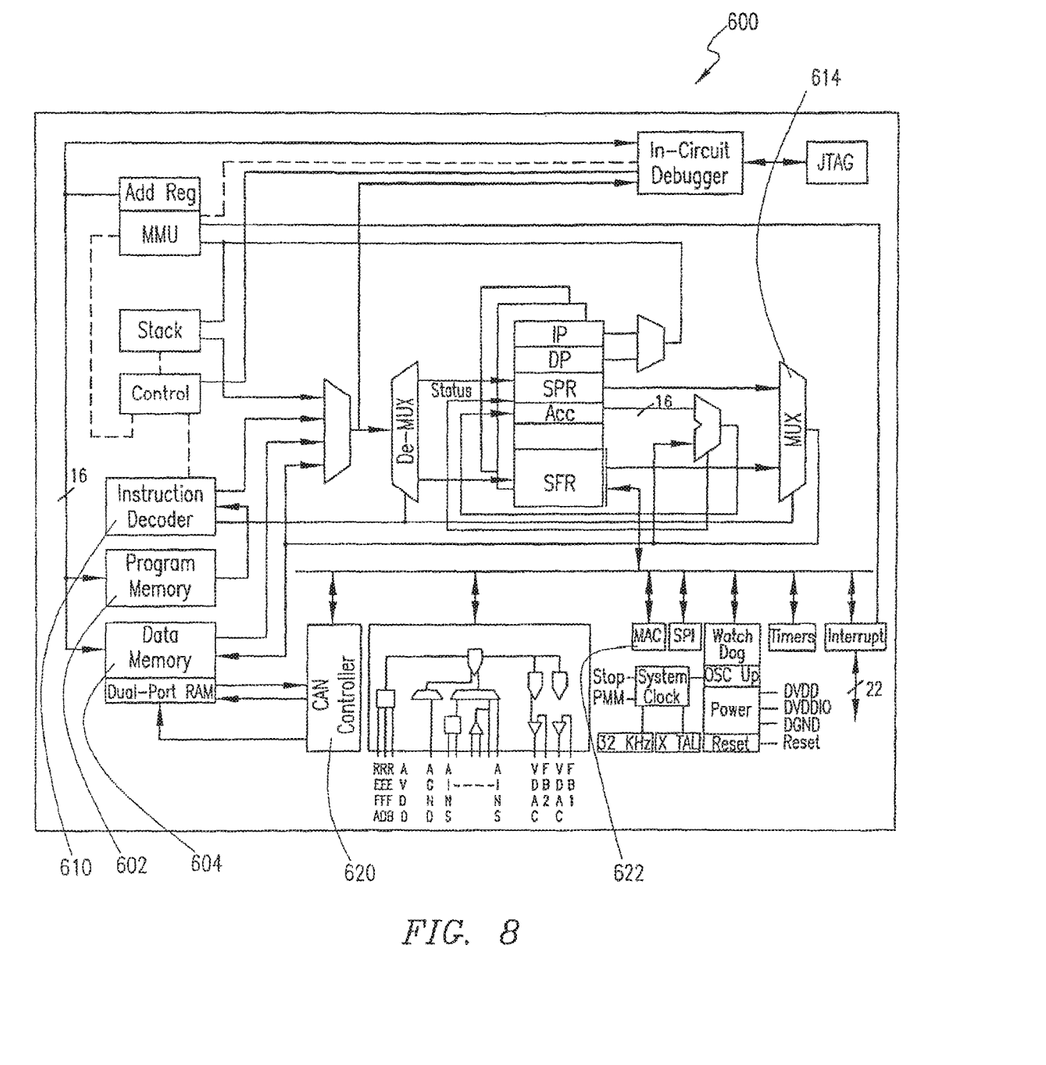
FIG. 8 is a schematic diagram illustrating a system implementing a microcontroller in accordance with an embodiment of the present invention.

Referring now to FIG. 8, a schematic diagram of a system implementing a microcontroller in accordance with an embodiment of the present invention is illustrated. The microcontroller 600 may be designed around the register modules with the transport network implemented as multiplexers 614. The SPRs and SFRs may be mapped into the same register map and controlled by the instruction decoder 610. Selected user functions may be incorporated into the microcontroller 600. The selected user functions may include a high performance analog front-end, a complex Control Area Network (CAN) controller 620 with dedicated dual port memory in the data memory space 604, high speed hardware multiplier/accumulator (MAC) 622, and other peripherals. External interrupts may be brought in via the I/O ports. User functions may be presented to the microcontroller 600 by assigning the control and/or data registers of each available function to the SFR space.

The previous description is of a preferred embodiment for implementing the invention, and the scope of the invention should not necessarily be limited by this description. The scope of the present invention is instead defined by the following claims.

We claim:

1. A microprocessor register map comprising:
   a first set of register specifiers that support single clock cycle operations;
   a second set of register specifiers that support multi-clock cycle operations; and
   wherein an instruction set supporting the microprocessor register map defines a single clock cycle operation by providing an instruction that identifies a source register and a destination register but does not explicitly specify a corresponding operation.

2. The microprocessor register map of claim 1 wherein the instruction set further comprises a format bit having a value indicating whether the instruction is an immediate source instruction or a register source instruction.

3. The microprocessor register map of claim 1 wherein the second set of register specifiers provide access protection on at least one register module.

4. The microprocessor register map of claim 1 wherein arithmetic and processing functions are realized by underlying hardware represented in the microprocessor register map.

5. The microprocessor register map of claim 1 wherein a register decode triggers data movement across a plurality of registers identified within the microprocessor register map.

6. The microprocessor register map of claim 1 wherein a prefix register module provides address extension that effectively scales the size of the microprocessor register map.

7. The microprocessor register map of claim 6 wherein the prefix register module provides a word extension to support different memory sizes.

* * * * *